Patented May 16, 1950

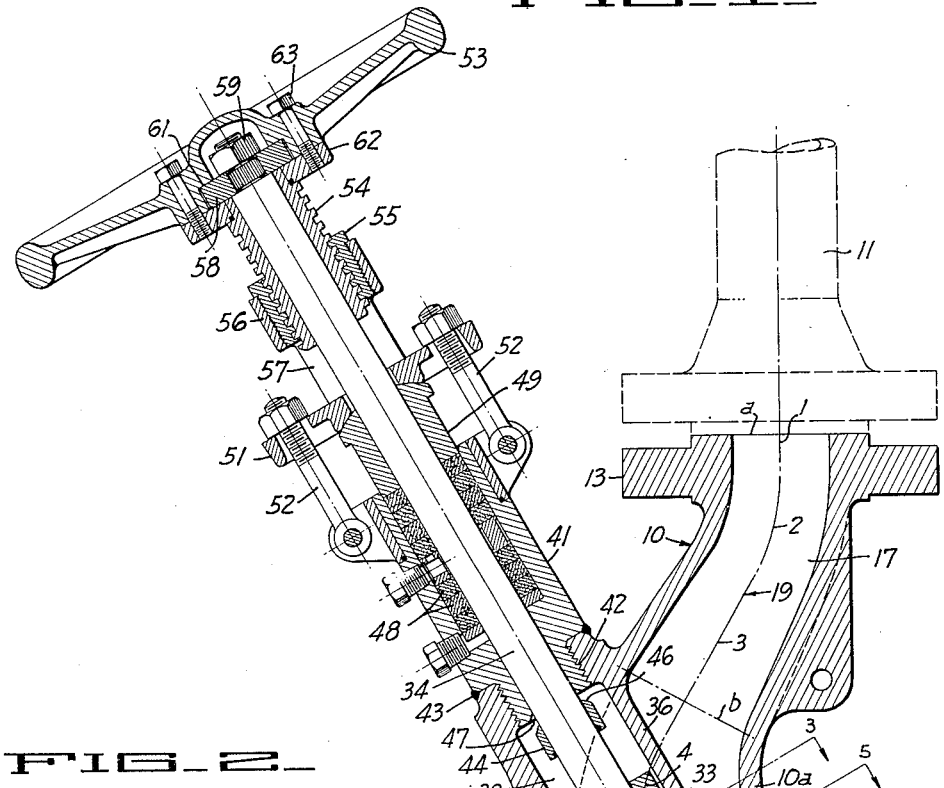

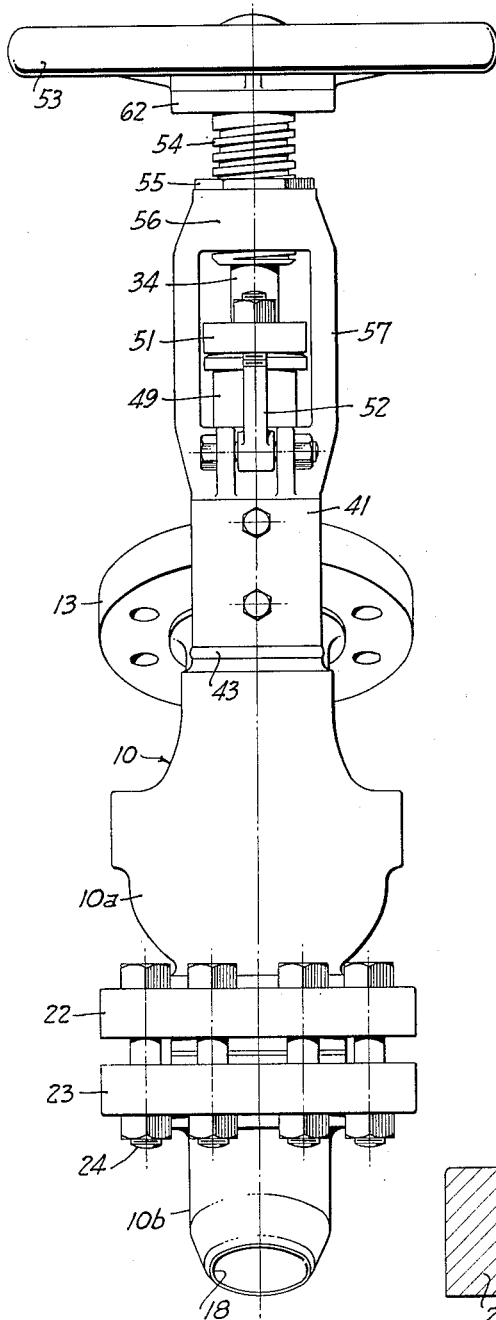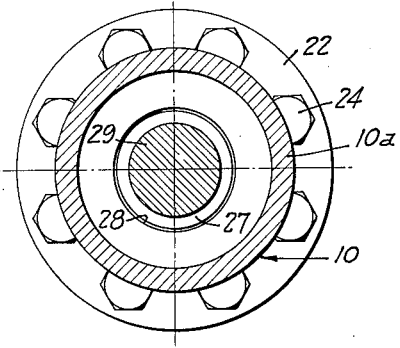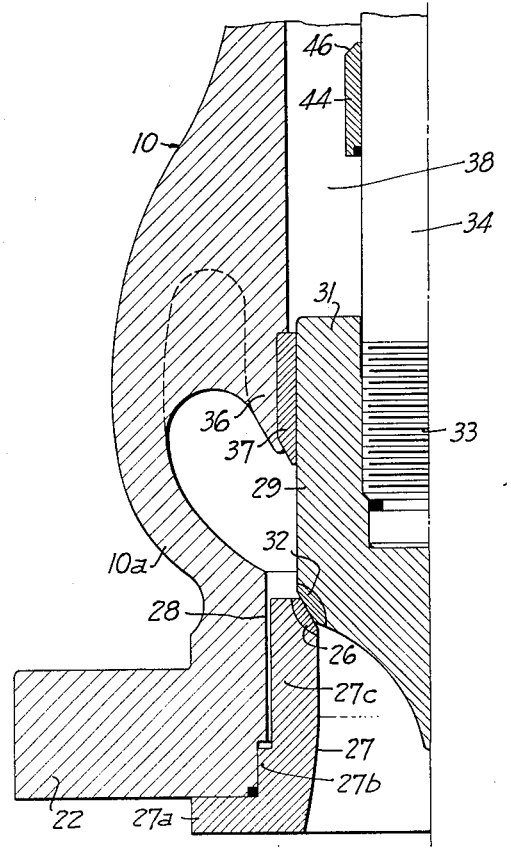

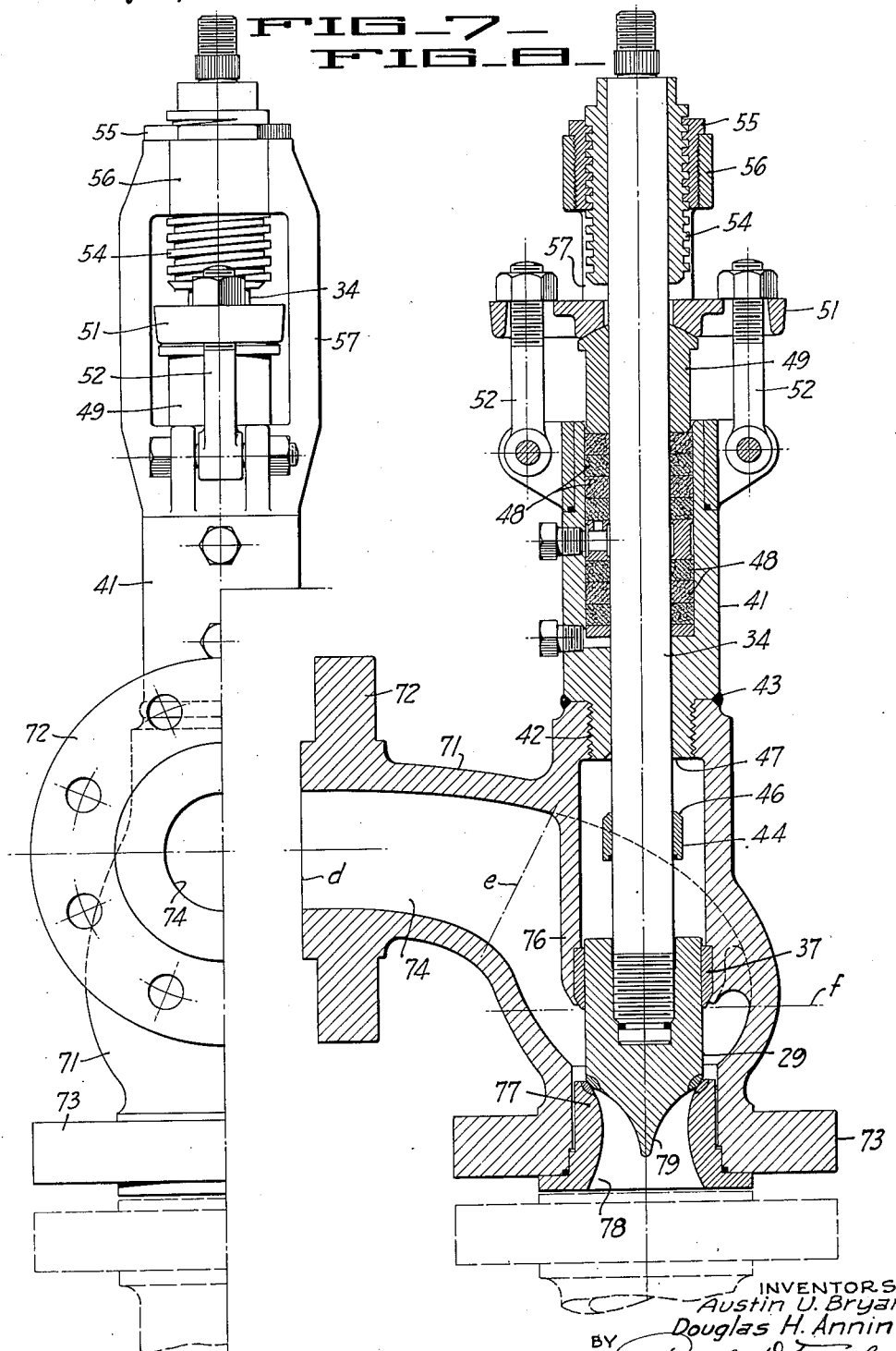

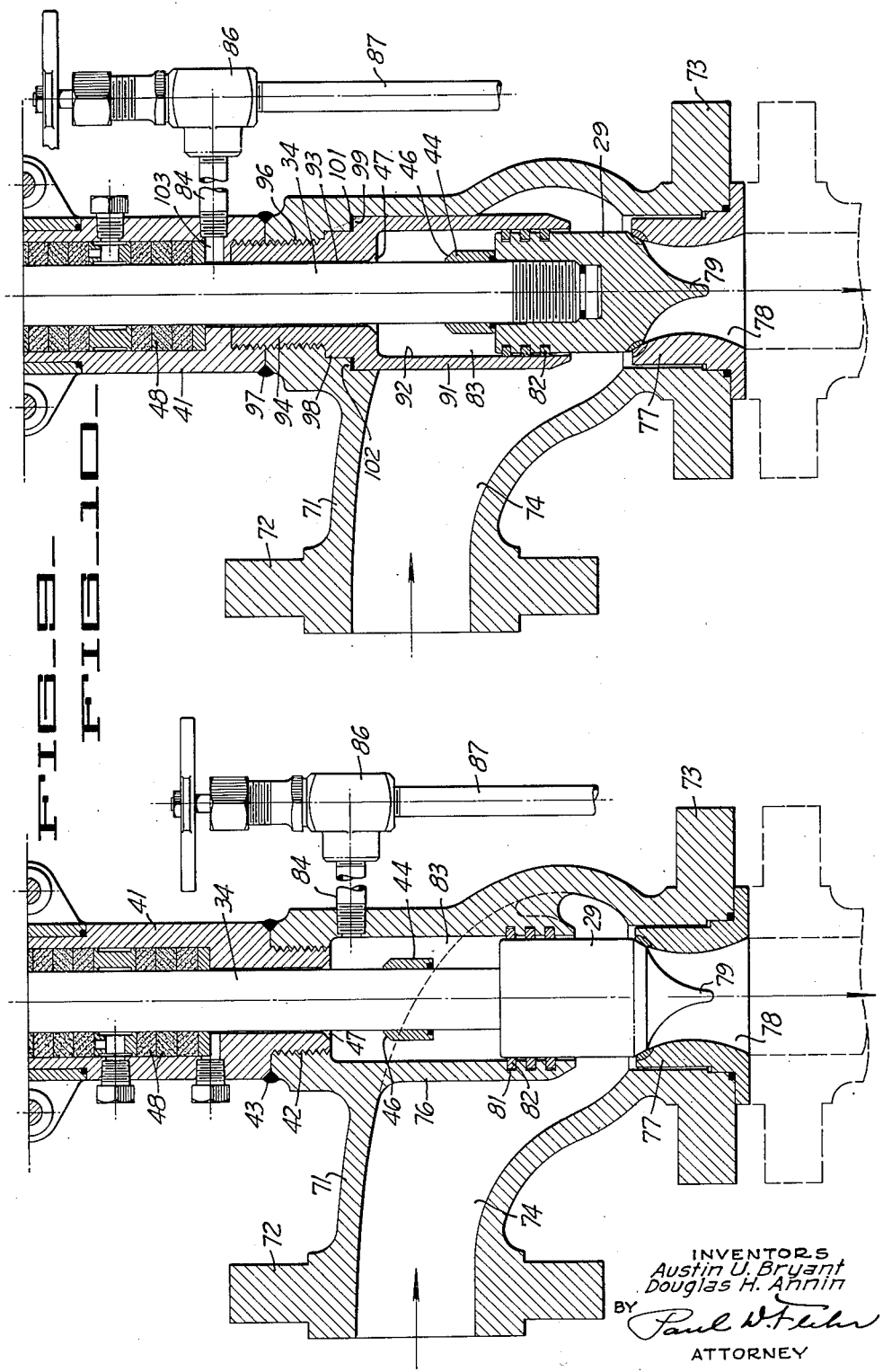

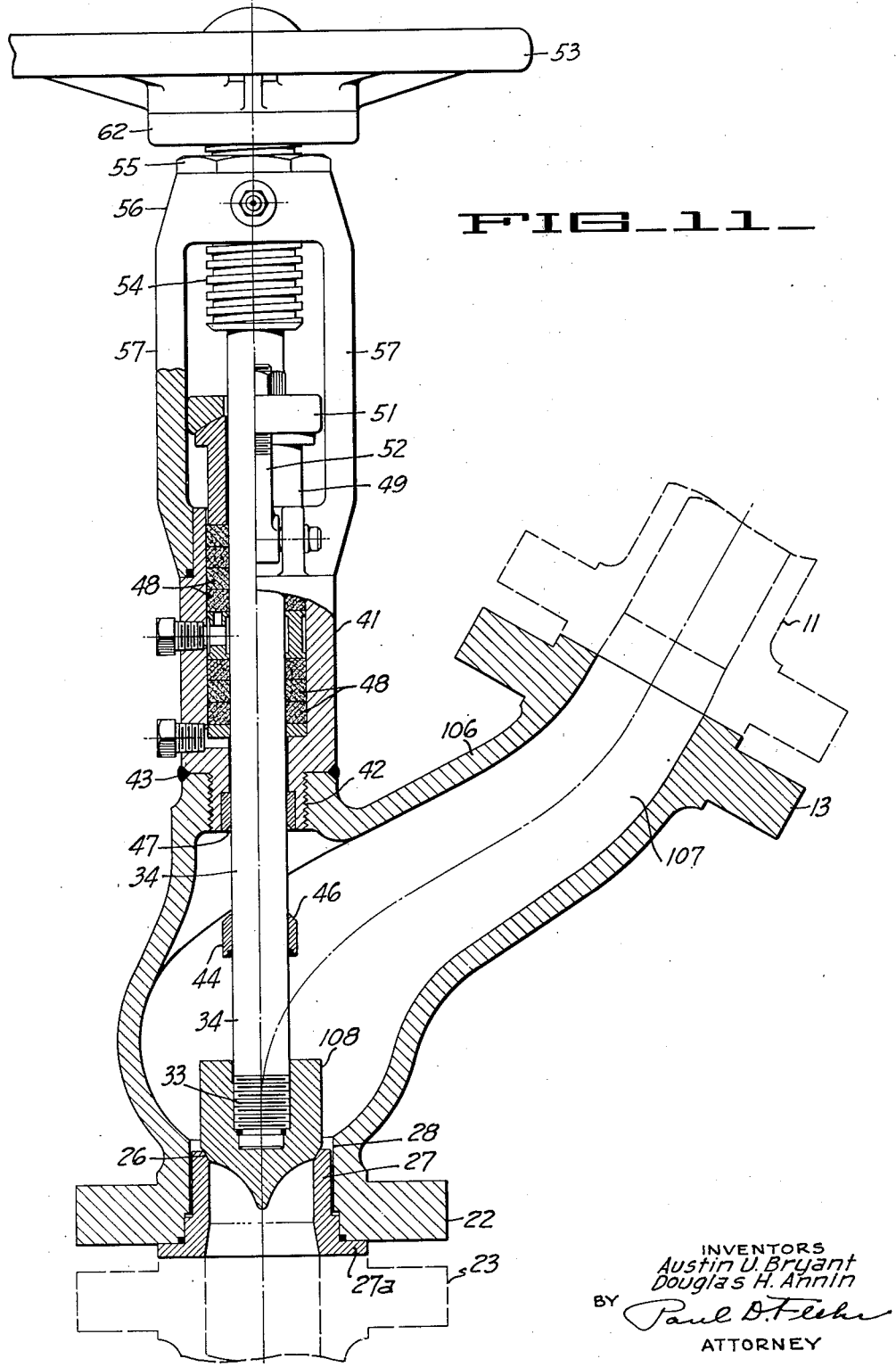

2,507,851

UNITED STATES PATENT OFFICE 2,507,851

VALVE CONSTRUCTION

Austin U. Bryant, Berkeley, and Douglas H. Annin, Oakland, Calif., assignors, by direct and mesne assignments, to Fluid Control Engineering Co., Emeryville, Calif., a copartnership consisting of M. H. Grove and J. E. Grove Application July 24, 1944, Serial No. 546,324

2 Claims. (Cl. 251—155)

This invention relates generally to valves and regulating devices of the type utilized for controlling the flow of various fluids, including liquids, air and other gases and steam.

In the past most conventional valves and flow regulating devices have been of the globe, gate or plug cock types. Gate valves and plug cocks have had the advantage of relatively low flow resistance for full open position, but they cannot be used successfully where it is necessary to regulate or throttle the flow. Also such valves are not reliable in affording a tight shut off, particularly in certain types of service such as where high temperatures are involved. Where it is necessary to throttle the flow it has been common to use valves of the globe type, but these have the serious disadvantage of offering a large amount of flow resistance for full open position of the valve member. In many piping installations such flow resistance involves serious complications in that to attain desired maximum flow requirements it is necessary to utilize relatively large size piping together with valves of excessive orifice size. As in the case of gate valves and plug cocks it is difficult to secure and maintain a tight shut off with conventional globe valves, particularly where the seating surfaces must be of metal, as is the case in many types of services.

It is an object of the present invention to provide a simple valve or regulator of the globe type having good throttling or regulating action while at the same time affording a relatively low flow resistance for full open position of the valve member.

A further object of the invention is to provide a globe valve having exceptionally good shut off characteristics, and which is capable of relatively long useful service without repair or replacement of the seating surfaces.

A further object of the invention is to provide a valve capable of use upon relatively high pressures and having provision to facilitate initial opening of the valve after a period of shut off.

Further objects of the invention will appear from the following description in which the preferred embodiment has been set forth in detail in conjunction with the accompanying drawing.

Referring to the drawing:

Figure 1 is a side elevational view in section illustrating a hand operated throttling valve incorporating the present invention.

Figure 2 is a cross-sectional detail taken along the line 2—2 of Figure 1.

Figure 3 is a cross-sectional detail taken along the line 3—3 of Figure 1.

Figure 4 is a side view of the same valve shown in Figure 1, and looking toward the left hand side of the same.

Figure 5 is a cross-sectional detail taken along the line 5—5 of Figure 1.

Figure 6 is an enlarged quarter-sectional detail showing the valve member in closed position upon the associated seating sleeve.

Figure 7 is a side view showing a modification of the invention adapted for use with inlet and outlet piping extending at right angles to each other.

Figure 8 is an elevational view in section, showing the same valve as Figure 7.

Figure 9 is a side elevational view in section showing a further embodiment of the invention having provision for facilitating initial opening of the valve against pressure.

Figure 10 is a side elevational view in section showing a further embodiment of the invention somewhat similar to Figure 9 but having a modified type of shroud for the valve member.

Figure 11 is a side elevational view in section showing a further embodiment of the invention in which the shroud about the valve member has been omitted.

The valve illustrated in Figure 1 consists of a valve body 10 adapted for connection with the aligned piping 11 and 12. What normally constitutes the inlet end of the valve body is shown provided with a flange 13 for coupling with the flange of piping 11, while the outlet end is shown having a welded connection 16 to the piping 12. It will be evident that the connecting means utilized may vary in different instances, and may for example utilize coupling threads or like conventional expedients.

The inlet and outlet flow passages 17 and 18 are formed symmetrically about the general flow axis line 19. It will be noted that while the entrant and exit ends of line 19 are in alignment, line 19 takes a peculiar path in which it first turns to a direction at an angle to the axis of pipe 11 (actually in this case about 30°) after which it makes a gradual turn toward and at an angle to the axis of pipe 12 (in this case about 30°). More specifically portion 1 of the flow center line is the entrant end which is in alignment with the axis of piping 11, portion 2 is curved and joins the portion 3, which is at an angle (e. g. 30°) to portion 1, portion 4 is gradually curved and connects with the linear portion 5 which extends through the valve seat to be presently described, and portion 6 is curved to merge with linear portion 7, which is in alignment with the axis of piping 12.

The body is preferably made in two separable parts 10a and 10b, with the part 10a forming the inflow passage and part 10b forming the principal part of the outflow passage. It is convenient to have these parts supplied with coupling flanges 22 and 23 secured together by clamping bolts 24.

The stationary seating surface 26 is formed upon one end of a seat sleeve 27, with this sleeve in turn being accommodated within the cylindrical bore 28. Certain features of sleeve 27 will be presently described. The valve member 29 co-operates with the stationary seating surface 26, and is adapted to move in opposite directions between full open and closed positions. In all of its operating positions the valve member 29 is aligned with the axis of the annular seating surface 26, this axis being coincident with the flow line portion 5. In the embodiment of Fig. 1 the flow line portion 5 and the above-mentioned axis are at angle of 30° with respect to the axis of pipes 11 and 12.

While the shaping of the valve member 29 may vary, in this instance it consists of a cylindrically shaped body 31 having a conically shaped valve surface 32 on its forward end. It is attached as by means of threaded conection 33 to the inner end of a valve operating rod 34.

Formed about the valve member there is a shroud 36, which is generally cylindrical in form (annular in cross-section), and which can be made as an integral part of the casting constituting the body part 10a. The upper end of the shroud 36, as viewed in Fig. 1, merges or joins with the adjacent wall of the body part 10a on a general plane which is inclined to the axis of rod 34. The lower end portion of the shroud 36, as viewed in Fig. 1, is machined to receive the liner ring 37, which forms a guide for the valve member 29. Above the liner 37 there is a pocket or recess 38 into which the valve member can be retracted for full open position.

In the embodiment of Figure 1 the valve operating rod 34 extends to the exterior through the closure head 41, which in turn is attached to the body part by threaded connection 42. This connection may be sealed by a welded connection 43.

Mounted upon that part of the operating rod 34 which is within the pocket 38, there is a sleeve or tube 44 which in manufacture can be secured to the rod as by brazing or soldering. The upper end of sleeve 44 (Figure 1) is provided with a conical seat 46, adapted to engage seat 47 formed upon the inner end of the closure head 41. Thus sleeve 44 not only forms a stop to limit opening movement of the valve member, but in addition engagement of the surfaces 46 and 47 provides a temporary seal about the valve operating rod for full open position, to facilitate renewal of packing.

Conventional packing means can be used about rod 34 to prevent leakage. For example packing rings 48 are shown about the rod within the closure head 41, and these rings are retained compressed by the follower 49. Follower 49 is held against the packing by the clamping plate 51, which in turn is engaged by the clamping bolts 52.

While the rod 34 may be operated in various ways and by different mechanisms, in this instance it is shown being operated manually by the hand wheel 53. This wheel is shown attached to a threaded sleeve 54 which is loosely disposed about the outer end of rod 34. Sleeve 54 is threaded in a bushing 55, which in turn is threaded in boss 56 which forms a part of a stationary yoke. The side members 57 of this yoke are rigidly carried by the upper end of the closure head 41. Threaded sleeve 54 is retained against lengthwise movement relative to rod 34 by a thrust ring or washer 58, which is retained upon the end of rod 34 by the nut 59. The thrust washer 58 is shown accommodated within an annular recess 61 formed in the hub of hand wheel 53, and it is retained within this recess by the ring 62 and cap screws 63. Ring 62 in turn is fixed to sleeve 54 as by hard solder or brazing.

The seating sleeve 27 is preferably of the type disclosed and claimed in copending application Serial No. 490,725, filed June 14, 1943, now abandoned. Briefly it consists of an outer flange 27a which is clamped tightly between the coupling flanges 22 and 23. Inwardly of this flange there is an annular shoulder 27b, and an extended cylindrical portion 27c, upon which the seating surface 26 is formed. Portion 27b fits relatively snugly within the body, and serves to centrally align the portion 27c. The outer peripheral surface of 27c has a substantial clearance with respect to the walls of the adjacent bore 28. This clearance can vary somewhat with different sized valves, as set forth in said copending application, but in a typical instance of a valve having a seating orifice measuring from 1 to 2½ inches in diameter, the clearance can be of the order of 0.005 inch (or 0.01 inch on the diameter). Conical seating surface 26, and also the conical valve surface 32, are formed on a relatively steep angle substantially greater than 45°, such as 60° with respect to a plane perpendicular to the axis of the valve member. Thus when the valve member is closed upon the seating surface, with suitable pressure, a substantial amount of the force upon the upper end of the sleeve 27 resolves itself into a radial component, tending to expand the ring. As set forth in said copending application Serial No. 490,725, such radial expansion materially aids in securing good shut off, and at the same time tends to greatly increase useful life of the valve working surfaces. The clearance between the sleeve portion 27c, and the adjacent wall of the body bore 28, is selected so that when sufficient force is applied by the valve member, radial spring of portion 27c may spring the periphery of the same into abutting contact with the sides of the bore 28. Thus the seat sleeve is protected against extreme forces which may be applied in shutting off the valve, because radial expansion of the sleeve to such an extent as would cause permanent injury, is prevented. When subjected to high temperatures, as for example when used to control flow of high temperature high presure steam, there may be some molecular slippage to cause the sleeve to assume a somewhat larger diameter. However sufficient clearance will be retained to attain the results described above.

Previous reference has been made to the flow center line 19 in explaining the general direction of flow through the valve body. The flow passage through the body is shaped in a peculiar and novel manner whereby in cooperation with other structural features, flow resistance through the valve for full open position of the valve member is reduced to a minimum. Taking first the entrant end of the passage 17, this is circular in contour and is formed to a diameter corresponding to the diameter of the pipe 11. Taking a as marking the entrant end of the passage, from this plane and to the plane b, which is near the shroud 36, the cross-sectional area of the passage 17 increases progressively. Preferably the increase is about twice, that is the cross-sectional area of plane *b* is about twice that of plane *a*. Beyond plane *b* passage 17 actually is divided by the shroud 36, as is shown by Figure 2. In other words passage 17 becomes substantially U-shaped to accommodate the flow about the shroud 36. The dimensions however are such that the cross-sectional flow area remains substantially the same as on plane *b*. In addition to dividing the flow about the shroud 36, the flow passage from plane *b* to the plane *c* at the lower end of shroud 36, is curved to change the direction of flow whereby on plane *c* it is flowing in a direction directly toward the valve seat 26. Furthermore on the plane *c* the flow passage is substantially annular and symmetrical as shown in Figure 5. From plane *c* to the upper end of the seat sleeve 27, the cross-sectional flow area is rapidly reduced to that of the orifice through the seat sleeve. However the flow direction is inwardly toward the axis of the seat sleeve, and downwardly toward the seat orifice, without obstructions such as would tend to cause turbulence.

While at plane *c* the flow passage is in the form of an annular ring, above this plane the flow passage is interrupted by a web 66. This web tends to prevent turbulence and swirling of fluid about the lower portion of the shroud 36 in a region where the flow about the shroud again merges, before progressing to the region of plane *c*.

Operation of the valve described above can be outlined as follows: The valve member 29 can be moved between open or closed positions, or to intermediate throttling positions, by turning the hand wheel 53. Assuming full open position, fluid entering the passage 17 has its kinetic velocity reduced because of the gradual increase in cross-sectional area to the plane *b*. In fact assuming that the cross-sectional area of plane *b* is twice that of plane *a*, the velocity is reduced one-half. While at the reduced velocity the flow divides and passes about the shroud 36. Turbulence is therefore greatly reduced in contrast to the turbulence which would occur if the velocity remained the same as that entering the valve. When the flow reaches the plane *c* it has been turned to a direction substantially parallel to the axis of the seat sleeve 27, and this turn in the direction of flow likewise occurs while the flow is at greatly reduced velocity. From plane *c* velocity of flow is rapidly accelerated until the fluid passes through the opening through the seat sleeve. After passing through the valve orifice there may be some increase in cross-sectional flow area, as illustrated, with the change in direction of flow through the body portion 10*b*.

Flow capacity of our valve for full open position of the same is far greater than is experienced with conventional globe valves, where the flow must turn sharp angles at unreduced velocity. In fact by the use of our construction it is possible in many piping systems to reduce the overall diameter of the piping employed, without a sacrifice in the capacity of the system as a whole. Also in an existing piping system it is possible to utilize valves of our construction with an orifice size considerably smaller than would be possible with a conventional globe valve construction, without a sacrifice in capacity.

Figs. 7 and 8 show a modification intended for use with inflow and outflow piping at right angles to each other. Such a valve is commonly referred to as an angle valve, as distinguished from a valve used with aligned piping. The body 71 in this instance is shown provided with couplings 72 and 73, for making connection with the inflow and outflow piping. The passage 74 in the body 71 is dimensioned in a manner similar to the passage 17 of Figure 1. Thus from planes *d* to *e* the passage increases in cross-sectional area, preferably to about twice the area on plane *d*. From planes *e* to *f* the cross-sectional area remains about the same. From plane *f*, which is at the end of the shroud 76, the cross-sectional flow area rapidly decreases to that of the orifice through the sleeve. The seating sleeve 77 in this instance is shown having its inner passage 78 streamlined Venturi tube fashion, in order to better cooperate with the streamlined extension 79 upon the lower end of the valve member 29.

While in the embodiments described above the valve member is operated by means of a hand wheel, it is evident that other operating means can be employed. For example the invention can be used in pressure reducing valves, back pressure regulators, pressure relief valves, or motor operated valves where the operating rod attached to the valve member may be moved by a fluid operated diaphragm, piston, or like motive means.

Previous reference has been made to the good shut off characteristics obtained because of the characteristics of the seat sleeve 27. Formation of the seating surfaces upon a comparatively steep angle such as 60° affords a substantial force component to expand the seat sleeve in a radial direction, for a reasonable amount of downward pressure applied to the valve member 29. If the seating surfaces were formed on an angle of say 30 or 45° an excessive amount of pressure would be required between the seating surfaces in order to provide a force component in a radial direction to properly spring the sleeve. Such excessive pressures would tend to mutilate and cause excessive wear of the seating surfaces particularly in that outward springing of the seat sleeve necessarily involves a slight amount of sliding movement between the seating surfaces.

With respect to the manner in which the seat sleeve is aligned within the valve body it should be noted that this sleeve is aligned entirely by virtue of the snug fit of the annular shoulder 27*b*, in the valve body, thus facilitating assembly and replacement of the seating sleeve with proper alignment at the inner end of the sleeve with respect to the valve body. A proper seal between the sleeve and the body can be assured by use of a suitable gasket under the flange portion 27*a* or by application of hard solder between portion 27*b* and the body.

The inner portion 27*c* of the seat sleeve should be of substantial length with respect to its diameter in order to enable outward springing of its upper end under the force of the valve member. For example as stated in said copending application 490,725 the ratio between the length and the outer diameter of this portion of the sleeve should be at least about 0.5 to 1 and preferably greater. In practice the ratio has been varied from 1 to 0.76 to 0.83 to 1.

It will be understood that sleeve portion 27*c* must have a wall thickness such that it can be sprung in a radial direction, while at the same time offering sufficient strength and resistance to outward springing to provide a proper support for the stationary seating surface. Thus for valves ranging from 1 to 2½ inches (pipe size)

the diameter of the inner sleeve portion can range from about 1.365 to 2.990 inches for a range of orifices from 0.938 to 2.375 inches. Where the valve is made in larger sizes such as in excess of 3 inches (pipe size) it is desirable to somewhat increase the clearance about sleeve portion 27c. For example it is satisfactory to increase the clearance about 0.0015 of an inch (or 0.003 of an inch on the diameter) for each increase of 1 inch in diameter in excess of 3 inches.

In the event it is necessary to repair or replace the seat sleeve, this sleeve can be readily removed from the valve body simply by removing the clamping bolts 24 which permits one to remove the seat sleeve, as for example by forcing it out of the body by pressure applied to the operating rod 34. Where the flange 27a or shoulder 27b may have been soldered to the body, such connection should of course first be loosened by heating. When it is necessary to repair or replace the valve member 29 this can be done simply by removing the closure head 41, after breaking the welded connection 43. Then the associated parts carried by the closure head 41 can be removed and the valve member 29 and rod 34 can be removed from the bottom of the body after removing seat 77.

The embodiment of Figure 9 is an angle valve having its body made similar to the angle valve of Figure 8. However in place of using the guide sleeve 37, in this instance the lower end portion of the shroud 76 is provided with annular grooves 81 to receive the piston rings 82. These rings fit about the periphery of the valve member 29. The chamber space 83 above the valve member 29 in this instance has its upper end communicating with the pipe 84, which connects through the manual valve 86 to the vent pipe 87. Pipe 87 may discharge to the atmosphere or to the low pressure side of the main valve.

Assuming that the valve is controlling relatively high fluid pressure, the pressure tending to hold valve member 29 in closed position may be such that the force required to initially open the valve member is excessive and beyond the mechanical capabilities of the opening means provided. Under such conditions opening of the valve 86 serves to reduce the pressure in space 83 to approximately atmospheric or to a low value compared to the inlet pressure, thus balancing the forces upon the valve member and making it possible to easily move the valve member to a desired open or intermediate position by turning the hand wheel 53. After initial opening of the valve member the valve 86 can be closed.

The embodiment of Figure 10 is similar to that of Figure 9 except that a different type of shroud is employed. Thus the shroud 91 in this instance is made as a part separate from the body 71 and is fitted into the body in a position aligned with the axis of the operating rod 34 in such a manner as to provide a portion for attachment of the closure head 41. In the detailed construction illustrated, the main portion of shroud 91 has a cylindrical bore 92 to receive the valve member 29. Its upper end has a bore 93 to loosely receive the operating rod 34. Also this upper end has an extended portion 94 which is externally threaded and which engages the internally threaded bore 96 of the body. The lower end of the closure head 41 is internally threaded to engage upon the projecting end of portion 94. This connection can be made fluid tight and of greater strength by the weld connection 97. Below the threaded portion 94 the shroud is shown provided with a portion 98 on an enlarged diameter, which fits within a corresponding bore provided in the body, and also with a shoulder 99 to enable clamping against a sealing gasket 101 which is placed between this shoulder and an opposed annular shoulder 102 formed on the valve body.

Instead of connecting the valve 86 to the upper part of space 83, the pipe 84 leading to this valve is shown conveniently connected to a port 103, which connects to the clearance about the operating rod 34. Thus opening of the valve 86 serves to vent fluid from space 83, the same as in Figure 9.

In the embodiment of Figure 10 the special separable shroud 91 facilitates manufacture of the valve, particularly in that it simplifies casting the valve body. In addition it provides a part which is replaceable, which in certain instances is a desirable feature in that one may wish to change the shroud together with parts of the valve operating mechanism.

The embodiment of Figure 11 differs from those previously described in that the shroud about the valve member has been omitted. Thus in this instance the valve body 106 is generally similar to the valve body shown in Fig. 1 and the inlet passage 107 in Fig. 11 is proportioned in substantially the same manner as in Fig. 1. The valve member 108 corresponds to valve member 29 of Fig. 1 and is similarly formed except that it may be somewhat shorter. The lower end of the valve operating rod 34 is directly surrounded by the flow through the inlet passage 107. Assuming that one uses the same proportioning as described with reference to Figure 1 the total cross sectional flow area afforded by the passages surrounding the lower end of the valve operating rod 34 is somewhat greater than twice the cross sectional flow area at the entrant end of the inlet passage 107.

The embodiment of Figure 11 will give flow characteristics far superior to a standard globe valve, although not to the optimum extent made possible by the modification of Figures 1 to 10 inclusive.

We claim:

1. In a fluid flow control device, a valve body having inlet and outlet flow passages, a stationary seat disposed within the body and having an annular seating surface surrounding a flow orifice, a valve member within the body and movable in opposite directions lengthwise of the axis between open and closed positions relative to the valve seat, means on the body for connecting the entrant and exit ends of the passage with associated piping, a valve operating rod attached to the valve member and extending to the exterior of the body on an axis concentric with the axis of the stationary seat, the inflow passage in the valve body having a cross-sectional area which gradually increases to a substantial extent from the entrant end of the same to the region of the valve member and then divides about the valve member without a substantial reduction in cross-sectional area, the general flow axis of the body having a linear portion of substantial length extending through the valve seat and having a gradually curved portion for a region extending a substantial distance beyond the inflow side of the seat, the curved portion leading toward the entrant end of the passage and in a general direction away from the inlet side and the plane of the seat, that portion of the inflow passage in a region near the inlet side of the stationary seat being substantially annular about the axis of the seat and serving to converge all of the fluid flow into the orifice of the stationary seat when the valve member is in open position.

2. In a fluid flow control valve, a valve body having inlet and outlet flow passages, a stationary seat disposed within the body and having an annular seating surface surrounding a flow orifice, a valve member within the body and movable in opposite directions lengthwise of its axis between open and closed positions relative to the valve seat, means on the body for connecting aligned entrant and exit ends of the passage with associated aligned piping, a valve operating rod attached to the valve member and extending to the exterior of the body on an axis concentric with the axis of the stationary seat and on an angle of the order of 30° to the piping axis, the inflow passage in the valve body having a cross-sectional area which gradually increases to a substantial extent from the entrant end of the same to the region of the valve member and which then divides about the valve member without a substantial reduction in cross-sectional area, the general flow axis of the body having a linear portion of substantial length extending axially through the valve seat and having a gradually curved portion for a region extending a substantial distance beyond the inflow side of the seat, the curved portion leading toward the entrant end of the passage and in a general direction away from the inlet side and the plane of the seat, said curved portion merging with a substantially linear portion which extends to the entrant end of the inlet passage at an angle of the order of 30° to the axis of the piping, that portion of the inflow passage in a region near the inlet side of the stationary seat being substantially annular about the axis of the seat and serving to converge all of the fluid flow into the orifice of the stationary seat when the valve member is in open position.

AUSTIN U. BRYANT.
DOUGLAS H. ANNIN.

REFERENCES CITED

The following references are of record in the file of this patent:

UNITED STATES PATENTS

| Number | Name | Date |
|---|---|---|
| Re. 4,762 | Adams | Feb. 20, 1872 |
| 995,484 | Rogers | June 20, 1911 |
| 1,448,717 | Slattery | Mar. 13, 1923 |

FOREIGN PATENTS

| Number | Country | Date |
|---|---|---|
| 198,149 | Great Britain | of 1923 |
| 384,422 | Great Britain | of 1932 |
| 598,350 | France | of 1925 |